June 12, 1951     T. T. MacLEAN     2,556,847
EYE SHIELD
Filed June 28, 1950
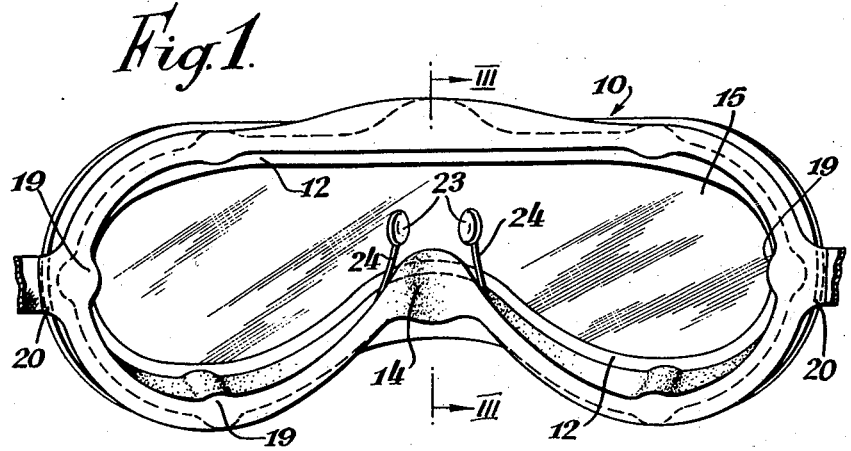
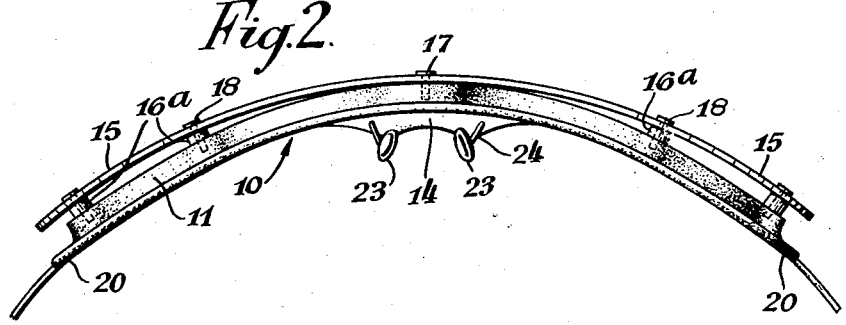
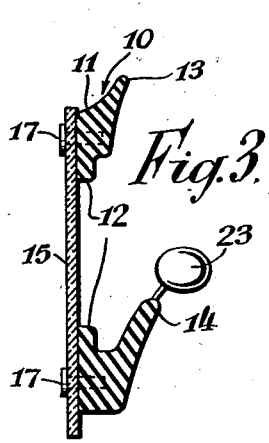
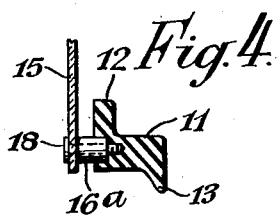
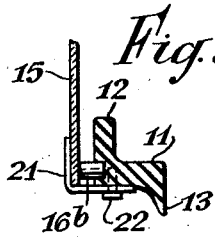
Inventor:
Thomas Traill MacLean
By: Morgan, Finnegan & Durham
Attorneys.

Patented June 12, 1951

2,556,847

UNITED STATES PATENT OFFICE

2,556,847

EYESHIELD

Thomas Traill MacLean, London, England, assignor to Anglo-Iranian Oil Company Limited, London, England, a British joint-stock corporation Application June 28, 1950, Serial No. 170,771, In Great Britain May 27, 1949

4 Claims. (Cl. 2—14)

This invention relates to eye shields.

It is among the objects of the invention to provide a form of eye shield which exerts very little pressure on the cheeks of the wearer, thereby making the shield more comfortable to wear. It is also an object of the invention to provide such a form of eye shield that will ensure effective ventilation over that part of the face covered by the shield.

According to the invention, an eye shield comprises a frame shaped to make a close fit around the eyes, and a transparent screen which is secured to the frame so as to be in close contact with the frame on the bridge of the nose and at a corresponding position in the centre of the brow and which is progressively spaced away from the frame towards the sides to allow air to pass between the frame and the screen, said frame having a flange which extends inwardly in a plane parallel to the plane of the transparent screen whereby solid and/or liquid particles are directed across the transparent screen and are prevented from moving inwardly towards the eyes.

The frame is advantageously of angle section, one arm being shaped at its end to conform to the contour of the face and the other arm extending inwardly to constitute the aforesaid flange. If desired, the end of the arm of the frame which contacts the face may be splayed outwardly to seat more comfortably upon the face, except in the region of the nose where the arm is splayed inwardly to seat upon the bridge of the nose.

According to the invention, furthermore, means may be provided for supporting the frame on the nose, such means advantageously consisting of a pair of pads secured to the ends of a bent wire or the like embedded in the frame. The wire may be bent or set to suit different widths and forms of nose.

The invention will now be described by way of example with reference to the accompanying drawings, wherein:

Figure 1 is an elevation of the eye shield looking from the face,

Figure 2 is a corresponding plan view,

Figure 3 is a section on the line III—III of Figure 2, and

Figures 4 and 5 illustrate two methods of securing the transparent screen to the frame.

The supporting frame, designated generally by 10, is moulded of rubber or plastic material and is of angle section, the arm 11 of the frame serving to space the transparent screen hereinafter described from the face, while the arm 12 extends inwardly parallel to said screen for the purpose hereinafter described. The end of the arm 11 is generally splayed outwardly where it contacts the face, as indicated at 13, but in the region of the nose it is splayed inwardly as indicated at 14 to seat upon the bridge of the nose.

A transparent screen 15 is secured to the frame so that it is progressively spaced away from the frame towards the edges of the frame. This effect is achieved by means of spacing members 16a which are embedded in the frame so as to project above the frame to an increasing extent towards the edges of the frame, while at the centre the screen 15 is in contact with the frame and is secured thereto by means of pins 17. The screen 15 is also secured to the spacing members 16a which are conveniently in the form of internally threaded tubular members (Figure 4) which are engaged by threaded pins 18 passed through the screen 15. The frame 10 is formed with enlarged portions 19 to accommodate the spacing members 16a, and with lugs 20 at its side edges for the attachment of a head band.

Alternatively, the screen 15 may be secured in position by means of bracket clips 21 (Figure 5) which are secured to the frame by means of laterally inserted pins 22, the spacing members in this case being in the form of solid members 16b.

A pair of pads 23 is provided for supporting the frame on the nose, said pads being secured to the ends of a wire 24 which is embedded in the frame. If desired, the wire may extend completely around the frame to constitute a reinforcement therefor.

Due to the progressive spacing of the screen 15 from the frame 10, air may circulate freely in contact with the region of the eyes, thereby avoiding unpleasant effects on the eyes, while the provision of the inwardly directed arm 12 ensures that solid and/or liquid particles that may pass inwardly between the screen and the frame, are directed across the screen and are prevented from moving towards the eye.

It will be understood that although the frame of necessity makes a close fit with the face throughout its periphery, pressure is exerted on the face only across the brow and on the bridge of the nose, the frame merely bearing lightly on the face at other positions sufficiently to form a seal.

I claim:

1. An eye shield comprising a frame shaped to make a close fit around the eyes, and a transparent screen which is secured to the frame so as to be in close contact with the frame on the bridge of the nose and at a corresponding position in the centre of the brow and which is progressively spaced away from the frame towards the sides to allow air to pass between the frame and the screen, said frame having a flange which extends inwardly in a plane parallel to the plane of the transparent screen whereby solid and/or liquid particles are directed across the transparent screen and are prevented from moving inwardly towards the eyes.

2. An eye shield according to claim 1, wherein the frame is of angle section, one arm being shaped at its end to conform to the contour of the face, and the other arm extending inwardly to constitute the aforesaid flange.

3. An eye shield according to claim 2, wherein the end of the arm of the frame which contacts the face is splayed outwardly to seat more comfortably upon the face, except in the region of the nose where the arm is splayed inwardly to seat upon the bridge of the nose.

4. An eye shield according to claim 1, wherein a pair of pads are carried by the frame for supporting the frame on the nose.

THOMAS TRAILL MacLEAN.

No references cited.